United States Patent
Xu et al.

(10) Patent No.: US 10,743,034 B2
(45) Date of Patent: Aug. 11, 2020

(54) METHOD OF DEBLOCKING FOR INTRA BLOCK COPY IN VIDEO CODING

(71) Applicant: HFI Innovation Inc., Zhubei, Hsinchu County (TW)

(72) Inventors: Xiaozhong Xu, Fremont, CA (US); Shan Liu, San Jose, CA (US)

(73) Assignee: HFI Innovation Inc., Zhubei, Hsinchu County (TW)

( * ) Notice: Subject to any disclaimer, the term of this patent is extended or adjusted under 35 U.S.C. 154(b) by 140 days.

(21) Appl. No.: 15/508,998

(22) PCT Filed: Aug. 26, 2015

(86) PCT No.: PCT/US2015/046887
§ 371 (c)(1),
(2) Date: Mar. 6, 2017

(87) PCT Pub. No.: WO2016/043933
PCT Pub. Date: Mar. 24, 2016

(65) Prior Publication Data
US 2017/0302966 A1    Oct. 19, 2017

Related U.S. Application Data

(60) Provisional application No. 62/050,258, filed on Sep. 15, 2014.

(51) Int. Cl.
*H04N 19/86* (2014.01)
*H04N 19/159* (2014.01)
(Continued)

(52) U.S. Cl.
CPC .......... *H04N 19/86* (2014.11); *H04N 19/105* (2014.11); *H04N 19/117* (2014.11);
(Continued)

(58) Field of Classification Search
CPC .. H04N 19/176; H04N 19/593; H04N 19/159; H04N 19/70; H04N 19/117; H04N 19/11; H04N 19/523
(Continued)

(56) References Cited

U.S. PATENT DOCUMENTS

| 2010/0260264 A1 | 10/2010 | Sun et al. |
| 2011/0033120 A1* | 2/2011 | Sezaki ............... G09G 5/08 |
| | | 382/203 |

(Continued)

FOREIGN PATENT DOCUMENTS

| CN | 103947208 A | 7/2014 |
| WO | 2013/037254 A1 | 3/2013 |

(Continued)

OTHER PUBLICATIONS

Marzuki et al., "Modified Deblocking Filtering Process for Intra Block Copy (IBC)," Joint Collaborative Team on Video Coding (JCT-VC) of ITU-T SG16 WP3 and ISO/IEC JTC1/SC29/WG11, Sapporo, Document JCTVC-R0118, Jun. 30-Jul. 9, 2014, 5 pages (Year: 2014).*

(Continued)

*Primary Examiner* — Daniel Chang
(74) *Attorney, Agent, or Firm* — Oblon, McClelland, Maier & Neustadt, L.L.P.

(57) ABSTRACT

A method and apparatus are directed to applying deblocking filter to block boundaries in a video coding system including an IntraBC (Intra-block copy) mode. For at least one combination of the two neighboring reconstructed blocks including at least one IntraBC coded block in the two neighboring reconstructed blocks, a boundary filter strength equal to one or zero is selected based on coding parameters associated with the two neighboring reconstructed blocks. Deblocking filter is then applied to neighboring samples of the two (Continued)

neighboring reconstructed blocks around the block boundary using the boundary filter strength selected. For example, when the two neighboring reconstructed blocks correspond to one IntraBC coded block and one Inter coded block, the boundary filter strength is set to one.

20 Claims, 5 Drawing Sheets

(51) Int. Cl.
*H04N 19/176* (2014.01)
*H04N 19/117* (2014.01)
*H04N 19/182* (2014.01)
*H04N 19/105* (2014.01)
*H04N 19/196* (2014.01)

(52) U.S. Cl.
CPC ......... *H04N 19/159* (2014.11); *H04N 19/176* (2014.11); *H04N 19/182* (2014.11); *H04N 19/196* (2014.11)

(58) Field of Classification Search
USPC ............. 375/240.02, 240.12, 240.13, 240.16
See application file for complete search history.

(56) References Cited

U.S. PATENT DOCUMENTS

| | | | |
|---|---|---|---|
| 2012/0281762 A1 | 11/2012 | Dane et al. | |
| 2014/0211848 A1 | 7/2014 | Hsu et al. | |
| 2014/0226721 A1 | 8/2014 | Joshi et al. | |
| 2014/0301465 A1 | 10/2014 | Kwon et al. | |
| 2014/0376634 A1* | 12/2014 | Guo | H04N 19/52 375/240.16 |
| 2015/0271515 A1* | 9/2015 | Pang | H04N 19/70 375/240.16 |
| 2016/0100163 A1* | 4/2016 | Rapaka | H04N 19/117 375/240.16 |
| 2016/0241868 A1* | 8/2016 | Li | H04N 19/86 |

FOREIGN PATENT DOCUMENTS

| | | | | |
|---|---|---|---|---|
| WO | WO-2013037254 A1 * | 3/2013 | | H04N 19/50 |
| WO | WO-2013066133 A1 * | 5/2013 | | |

OTHER PUBLICATIONS

Rosewarne et al., "On Deblocking for Intra Block Copy," Joint Collaborative Team on Video Coding (JCT-VC) of ITU-T SG16 WP3 and ISO/IEC JTC1/SC29/WG11, Sapporo, Document JCTVC-R0126, Jun. 30-Jul. 9, 2014, 3 pages (Year: 2014).*

Pang et al., "Non-SCCE1: Intra block copy deblocking," Joint Collaborative Team on Video Coding (JCT-VC) of ITU-T SGI6 WP3 and ISO/IEC JTC1/SC29/WG11, Sapporo, Document JCTVC-R0189, Jun. 30-Jul. 9, 2014, 4 pages (Year: 2014).*

Kim, I.K., et al.; "High Efficiency Video Coding (HEVC) Encoder Description 14 (HM14);" International Organization for Standardization; Jan. 2014; pp. 1-37.

Pang, C., et al.; "Non-RCE3: Intra Motion Compensation with 2-D MVs;" Joint Collaborative Team on Video Coding (JCT-VC) of ITU-T SG 16 WP 3 and ISO/IEC JTC 1/SC 29/ WG 11; Jul.-Aug. 2013; pp. 1-12.

McCann, K., et al.; "High Efficiency Video Coding (HEVC) Test Model 16 (HM16);" Joint Collaborative Team on Video Coding (JCT-VC) of ITU-T SG16 WP3 and ISO/IEC JTC1/SC29/ WG11; Jun.-Jul. 2014; pp. 1-59.

International Search Report dated Nov. 23, 2015, issued in application No. PCT/US2015/046887.

* cited by examiner

*Prior Art*

METHOD OF DEBLOCKING FOR INTRA BLOCK COPY IN VIDEO CODING

CROSS REFERENCE TO RELATED APPLICATIONS

The present invention claims priority to U.S. Provisional Patent Application, Ser. No. 62/050,258, filed on Sep. 15, 2014. The U.S. Provisional Patent Application is hereby incorporated by reference in its entirety.

FIELD OF THE INVENTION

The present invention relates to video coding using coding modes including Intra-block copy (IntraBC). In particular, the present invention relates to deblocking filter to improve the visual quality by alleviating artifacts around block boundaries for a video coding system including the IntraBC mode.

BACKGROUND AND RELATED ART

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition. Several coding tools for screen content coding have been developed. These tools related to the present invention are briefly reviewed as follow.

FIG. 1A illustrates an exemplary adaptive Inter/Intra video coding system incorporating in-loop processing according to HEVC. For Inter-prediction, Motion Estimation (ME)/Motion Compensation (MC) 112 is used to provide prediction data based on video data from other picture or pictures. Switch 114 selects Intra Prediction 110 or Inter-prediction data and the selected prediction data is supplied to Adder 116 to form prediction errors, also called residues. The prediction error is then processed by Transformation (T) 118 followed by Quantization (Q) 120. The transformed and quantized residues are then coded by Entropy Encoder 122 to form a video bitstream corresponding to the compressed video data. The bitstream associated with the transform coefficients is then packed with side information such as motion, mode, and other information associated with the image area. The side information may also be subject to entropy coding to reduce required bandwidth. Accordingly, the data associated with the side information are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, various in-loop processing is applied to the reconstructed video data to improve visual quality before the reconstructed video data are stored in the Reference Picture Buffer 134 in order to improve video quality. In the High Efficiency Video Coding (HEVC) standard being developed, Deblocking Filter (DF) 130 and Sample Adaptive Offset (SAO) 131 have been developed to enhance picture quality. The in-loop filter information may have to be incorporated in the bitstream so that a decoder can properly recover the required information. Therefore, in-loop filter information from SAO is provided to Entropy Encoder 122 for incorporation into the bitstream. In FIG. 1A, DF 130 is applied to the reconstructed video first and SAO 131 is then applied to DF-processed video. However, the processing order among DF and SAO can be re-arranged.

A corresponding decoder for the encoder of FIG. 1A is shown in FIG. 1B. The video bitstream is decoded by Entropy Decoder 142 to recover the transformed and quantized residues, SAO information and other system information. At the decoder side, only Motion Compensation (MC) 113 is performed instead of ME/MC. The decoding process is similar to the reconstruction loop at the encoder side. The recovered transformed and quantized residues, SAO information and other system information are used to reconstruct the video data. The reconstructed video is further processed by DF 130 and SAO 131 to produce the final enhanced decoded video.

The coding process in HEVC encodes or decodes a picture using a block structure named Largest Coding Unit (LCU). The LCU is adaptively partitioned into coding units (CUs) using quadtree. In each leaf CU, DF is performed for each 8×8 block and in HEVC, the DF is applied to 8×8 block boundaries. For each 8×8 block, horizontal filtering across vertical block boundaries (also called vertical edges) is first applied, and then vertical filtering across horizontal block boundaries (also called horizontal edges) is applied. During processing of a luma block boundary, four pixels on each side of the boundary are involved in filter parameter derivation, and up to three pixels on each side of the boundary may be changed after filtering.

FIG. 2 illustrates the pixels involved in the DF process for a vertical edge 210 between two blocks, where each smallest square represents one pixel. The pixels on the left side (i.e., pixel columns p0 to p3 as indicated by 220) of the edge are from one 8×8 reconstructed block, and the pixels on the right side (i.e., pixel columns q0 to q3 as indicated by 230) of the edge are from another 8×8 reconstructed block. In the DF process according to HEVC, the coding information of the two 8×8 blocks is used to calculate the boundary filter strength (also referred to as BS or boundary strength) of the edge first. After the boundary filter strength is determined, columns p0-p3 and q0-q3 of the reconstructed pixels are used to derive filter parameters including filter on/off decision and strong/weak filter selection.

FIG. 3 illustrates the boundary pixels involved in the DF process for a horizontal edge 310, where each smallest square represents one pixel. The pixels on the upper side (i.e., pixel rows p0 to p3 as indicated by 320) of the edge are from one 8×8 reconstructed block, and the pixels on the lower side (i.e., pixel rows q0 to q3 as indicated by 330) of the edge are from another 8×8 reconstructed block. The DF process for the horizontal edge is similar to the DF process for the vertical edge.

According to HEVC, three levels (i.e., 2, 1 and 0) of boundary filter strength may be used. For a strong boundary (i.e., more visible boundary), a stronger deblocking filter is used to cause smoother boundary. A stronger DF is indicated by BS=2 and a weaker DF is indicated by BS=1. When BS is equal to 0, it indicates no deblocking filter.

Currently, extensions of HEVC (High Efficiency Video Coding) are being developed, including screen content coding (SCC) and 3D extensions. The screen content coding targets at coding screen captured content, with non-4:2:0 color formats, such as 4:2:2 and 4:4:4, and video data with higher bit-depths such as 12, 14 and 16 bit-per-sample while the 3D extension targets at the coding of multi-view video with depth data.

During the Course of SCC development, various video coding tools have been described, including the "Intra picture block copy" (IntraBC) technique. The IntraBC technique was first disclosed in JCTVC-M0350 (Budagavi et al., *AHG8. Video coding using Intra motion compensation*, Joint Collaborative Team on Video Coding (JCT-VC) of ITU-T SG16 WP3 and ISO/IEC JTC 1/SC 29/WG11 13th Meeting: Incheon, KR, 18-26 Apr. 2013, Document: JCTVC-M0350). An example according to JCTVC-M0350 is shown in FIG. 4, where a current coding unit (CU, 410) is coded using Intra MC (motion compensation). The prediction block (420) is located from the current CU and a displacement vector (412). In this example, the search area is limited to the current CTU (coding tree unit), the left CTU and the left-left CTU. The prediction block is obtained from the already reconstructed region. Then, the displacement vector, also named motion vector (MV) or block vector (BV), and residual for the current CU are coded. It is well known that the HEVC adopts CTU and CU block structure as basic units for coding video data. Each picture is divided into CTUs and each CTU is reclusively divided into CUs. During prediction phase, each CU may be divided into multiple blocks, named prediction units (PUs) for performing prediction process.

Modifications based on JCTVC-M0350 is disclosed in JCTVC-N0256 (Pang et al., Non-RCE3: Intra Motion Compensation with 2-D Mrs, Joint Collaborative Team on Video Coding (JCT-VC) of ITU-T SG16 WP3 and ISO/IEC JTC 1/SC 29/WG11 14th Meeting: Vienna, AT, 25 Jul.-2 Aug. 2013, Document: JCTVC-N0256) to allow both horizontal and vertical BV components be non-zero. Furthermore, BV coding methods are disclosed in JCTVC-N0256. One method uses the left or above BV as the BV predictor and codes the resulting BVD (BV differences). A flag is signaled first to indicate whether the BVD is zero. When BVD is not zero, an exponential-Golomb of $3^{rd}$ order code is used to encode the remaining absolute level of the BVD. The sign of BVD is coded using a flag. According to another method, no predictor is used and the BV is coded using the exponential-Golomb codes used for BVD coding in HEVC.

JCTVC-N0256 also discloses some pipeline friendly approaches. For example, no interpolation filters are used. Furthermore, the BV search area is restricted. In one example, the search area is restricted to the current CTU and the left CTU. In another example, the search area is restricted to the current CTU and the rightmost 4 columns of the left CTU.

In SCM-2.0 (Joshi et al., Screen content coding test model 2 (SCM 2), Joint Collaborative Team on Video Coding (JCT-VC) of ITU-T SG 16 WP3 and ISO/IEC JTC 1/SC29/WG11, 18th Meeting: Sapporo, JP, 30 Jun.-9 Jul. 2014, Document: JCTVC-R1014), the block vector (BV) coding is modified to use the neighboring BVs and coded BVs as BV predictor (BVP) according to JCTVC-R0309 (Pang, et al., Non-SCCE1: Combination of JCTVC-R0185 and JCTVC-R0203, Joint Collaborative Team on Video Coding (JCT-VC) of ITU-T SG 16 WP3 and ISO/IEC JTC 1/SC29/WG11, 18th Meeting: Sapporo, JP, 30 Jun.-9 Jul. 2014, Document: JCTVC-R0309). The BV predictor is derived similar to the AMVP scheme in HEVC. The predictor candidate list is constructed by first accessing in order the spatial neighboring blocks a1 and b1 as shown in FIG. 5. If any of the spatial neighbors does not have a block vector, the last 2 coded BVs, which are initialized with (−2*CU width, 0) and (−CU width, 0), are used to fill into the block vector candidate list to make it contain two different entries. To avoid the need for the line buffer, the above BV outside the current CTU is considered unavailable. The last two coded BVs are reset to (0, 0) for each CTU to prevent the data dependency.

Currently, the BV for IntraBC coded block is at integer accuracy, which is different from MV for Inter coded block, which is at quarter-pel accuracy.

According to SCM-2.0, deblocking filter process will be executed along block boundaries after the reconstruction process similar to the conventional HEVC. A boundary filter strength (BS) will decide whether strong filtering, weak filtering or no filtering should be applied to a boundary. In HEVC, if an edge needs deblocking filter, different block boundary filtering strengths (BS) are assigned to block boundaries with different properties. In summary, the following BS decision process is applied:

Step 1. Test 1 corresponding to whether any block on a side of the block boundary is Intra coded is performed. If the result is asserted (i.e., result=yes), BS is assigned a value equal to 2 and the BS decision process is terminated. Otherwise, the BS decision process goes to step 2.

Step 2. Test 2 corresponding to whether the block boundary is also a transform block edge and at least one block on a side of the block boundary has non-zero coefficients is performed. If the result is asserted (i.e., result=yes), BS is assigned a value equal to 1 and the BS decision process is terminated. Otherwise, the BS decision process goes to step 3.

Step 3. Test 3 on coding parameters related to the two blocks on two sides of the block boundary is performed. BS is assigned a value equal to 1 or 0 based on the test 3 result. Coding parameters such as RefList (reference picture list, also referred to as reference list), RefIdx (reference picture index, also referred to as reference index), the number of MVs used, and MV differences of both sides may be used for test 3. For example, when two blocks refer to the same picture and the difference between two MVs are smaller than one integer pixel (either component), BS is set to 0. Otherwise BS is set to 1.

For a boundary edge in the case when an IntraBC coded block at one side of the block boundary is involved, the deblocking filter BS decision according to the current HEVC practice treats the IntraBC coded block as an Intra coded block. Accordingly, the BS for the related edges is assigned a value equal to 2 for the deblocking filter operation if any of the two blocks next to the block boundary is IntraBC coded.

According to the current deblocking filter practice involved with IntraBC coded blocks, the filtering process treats the IntraBC coded block in a way similar to Intra block. Therefore, it may not result in desirable visual quality when IntraBC coded blocks are involved. Accordingly, it is desirable to develop deblocking filter process for block boundary associated with IntraBC coded blocks to improve visual quality.

BRIEF SUMMARY OF THE INVENTION

A method and apparatus for applying deblocking filter to block boundaries in a video coding system including an IntraBC (Intra-block copy) mode are disclosed. According to the present invention, for at least one combination of the two neighboring reconstructed blocks including at least one IntraBC coded block in the two neighboring reconstructed blocks, a boundary filter strength equal to one or zero is selected based on coding parameters associated with the two neighboring reconstructed blocks. Deblocking filter is then applied to neighboring samples of the two neighboring reconstructed blocks around the block boundary using the boundary filter strength selected.

In one embodiment, when the IntraBC coded block is signaled using a reference picture index value and the two neighboring reconstructed blocks correspond to one IntraBC coded block and one Inter coded block, if the block boundary is also a transform block edge and at least one of the two neighboring reconstructed block has one or more non-zero coefficients, the boundary filter strength is set to one. If the block boundary is not a transform block edge or none of the two neighboring reconstructed block has non-zero coefficients, the boundary filter strength is set to one or zero according to factors selected from a coding-parameter group comprising the reference picture list (RefList), the reference picture index (RefIdx), the number of motion vectors used, and motion vector difference associated with the two neighboring reconstructed blocks.

In another embodiment, when the IntraBC coded block is signaled using a reference picture index value and the two neighboring reconstructed blocks correspond to two IntraBC coded blocks, if the block boundary is also one transform block edge and at least one of the two neighboring reconstructed block has one or more non-zero coefficients, the boundary filter strength is set to one. If the block boundary is not one transform block edge or none of the two neighboring reconstructed block has non-zero coefficients, the boundary filter strength is set to one or zero according to one or more factors selected from a coding-parameter group comprising RefList, RefIdx, a number of motion vectors used, and motion vector difference associated with the two neighboring reconstructed blocks.

In yet another embodiment, when each IntraBC coded block is signaled using a reference picture index value and the two neighboring reconstructed blocks correspond to one IntraBC coded block and one Inter coded block, a specific reference picture index is assigned to the IntraBC coded block. The current picture is used as a reference picture for the IntraBC coded block. The current picture is assigned to a reference picture list corresponding to L0, L1, or a separate reference picture list different from L0 and L1. The specific reference picture index corresponds to a value not used by regular Inter reference pictures in a current slice header. The specific reference picture index may correspond to −1 or a total number of reference picture indices in reference picture list L0 or L1.

According to another embodiment, when each IntraBC coded block is signaled using a reference picture index value and the two neighboring reconstructed blocks correspond to two IntraBC coded blocks, a same specific reference picture list and a same specific reference picture index are assigned to these two IntraBC coded blocks.

In the case of IntraBC signaling based on using an IntraBC flag, if the two neighboring reconstructed blocks correspond to one IntraBC coded block and one Inter coded block, the boundary filter strength is set to one. If the two neighboring reconstructed blocks correspond to two IntraBC coded blocks, the boundary filter strength is set to one if a difference between two block vectors associated with the two IntraBC coded blocks is greater than or equal to a threshold and the boundary filter strength is set to zero otherwise. The threshold may correspond to one, two or four.

In one embodiment, if any of the two neighboring reconstructed blocks refers to a compensation block from another picture, any of the two neighboring reconstructed blocks is considered as an Inter coded block with regard to the selection of the boundary filter strength.

In another embodiment, if a boundary block is IntraBC coded block, the block vector of the IntraBC coded block is converted to quarter-sample accuracy with regard to selecting the boundary filter strength as one or zero based on one or two coding parameters. For example, the block vector of the IntraBC coded block can be converted to the quarter-sample accuracy by left-shifting the block vector by two.

DETAILED DESCRIPTION OF THE INVENTION

Figure 1A:
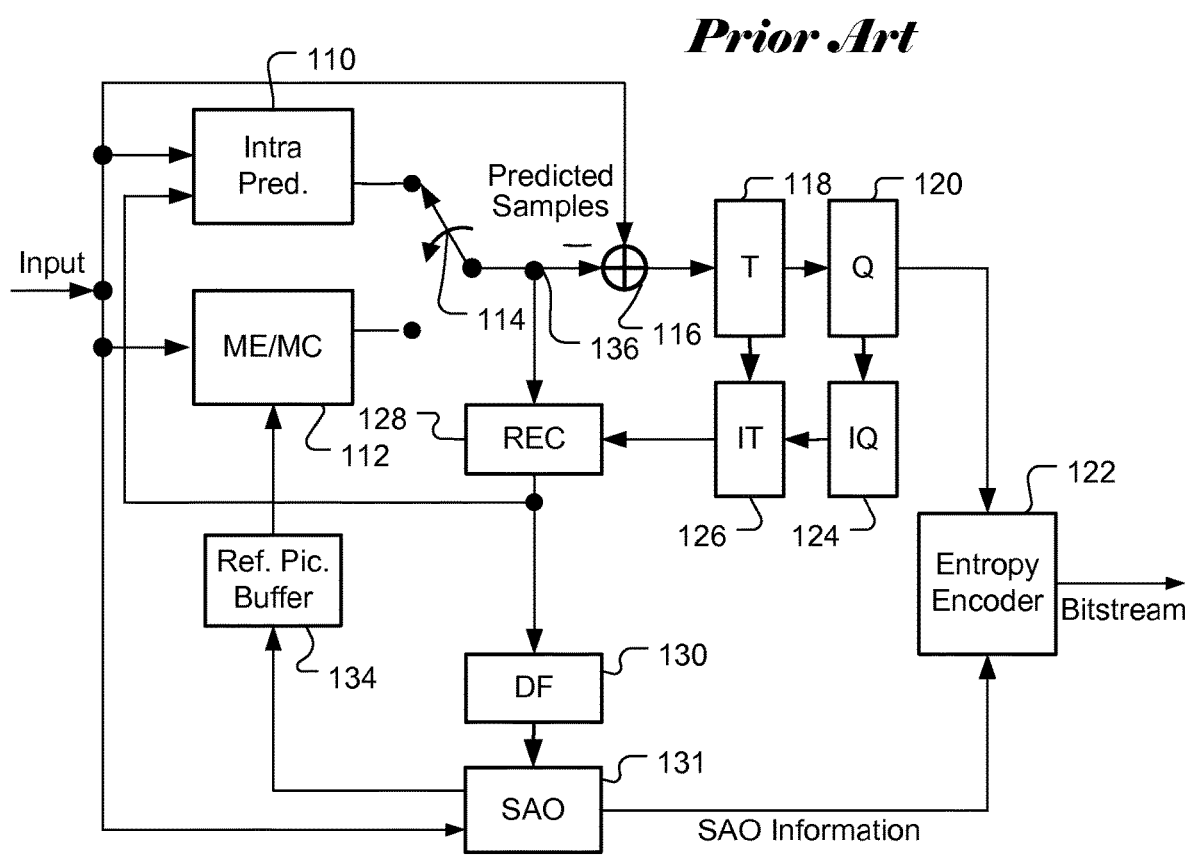
FIG. 1A illustrates an exemplary adaptive inter/intra video encoding system according to the high efficiency video coding (HEVC) standard incorporating DF and SAO in-loop processing.
Figure 1B:
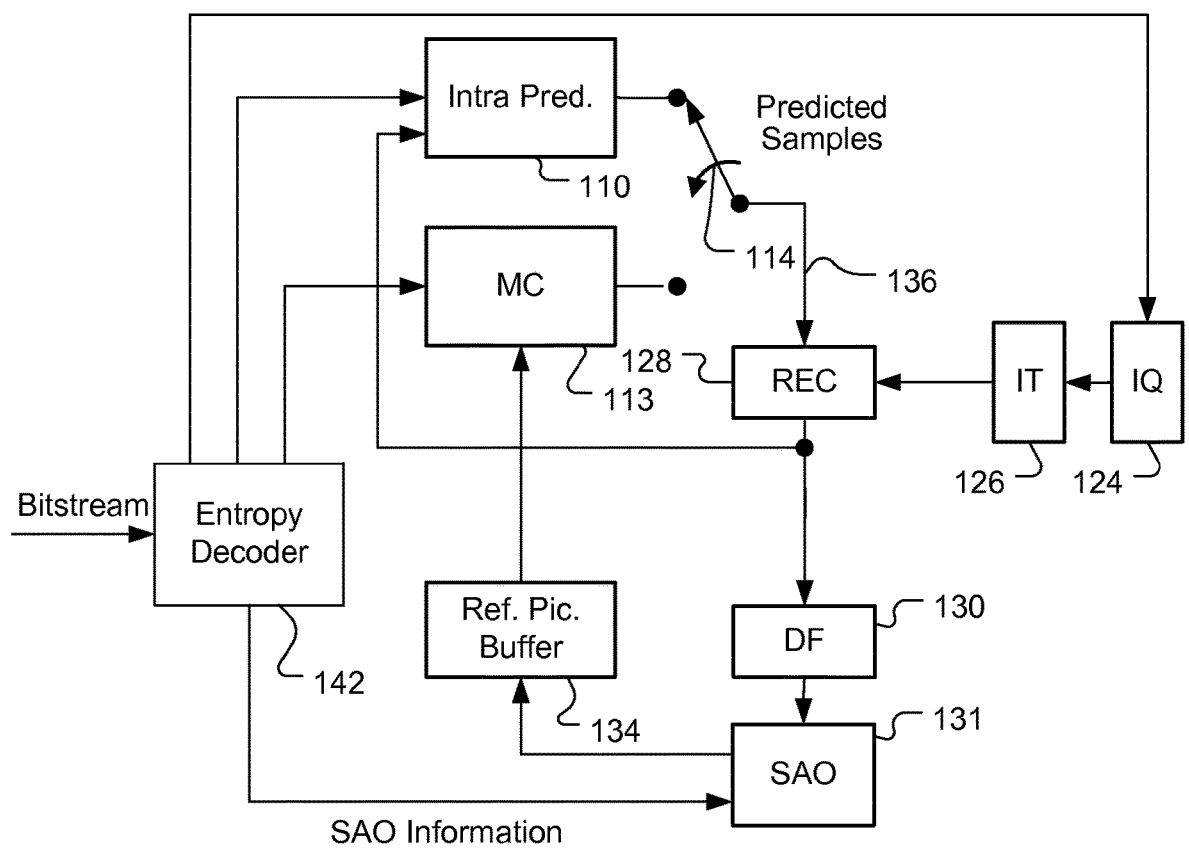
FIG. 1B illustrates an exemplary adaptive inter/intra video decoding system according to the high efficiency video coding (HEVC) standard incorporating DF and SAO in-loop processing.
Figure 2:
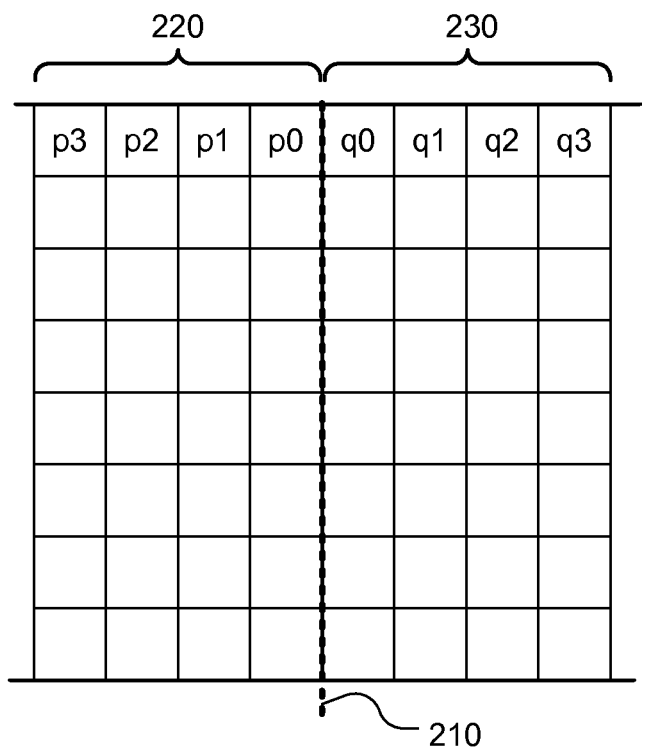
FIG. 2 illustrates an example of a vertical block edge between two 8×8 blocks for deblocking filter.
Figure 3:
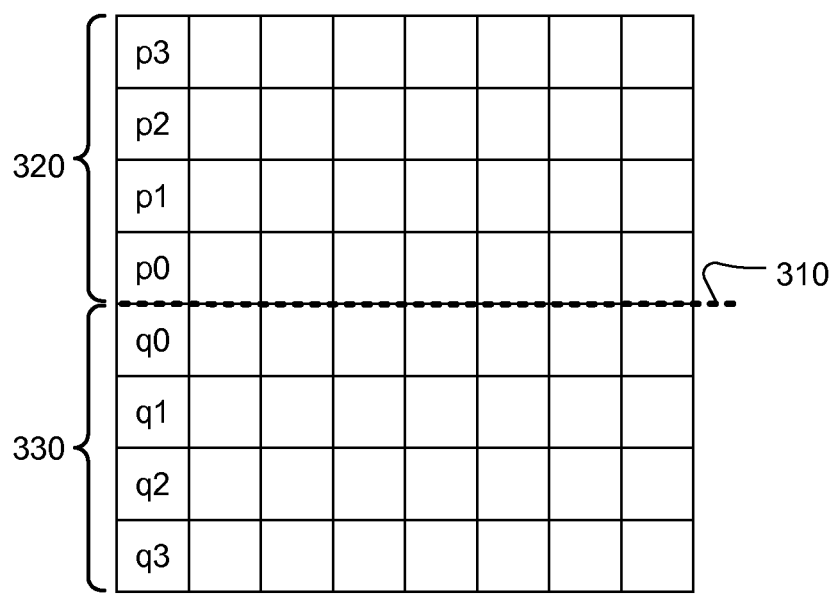
FIG. 3 illustrates an example of a horizontal edge between two 8×8 blocks for deblocking filter.
Figure 4:
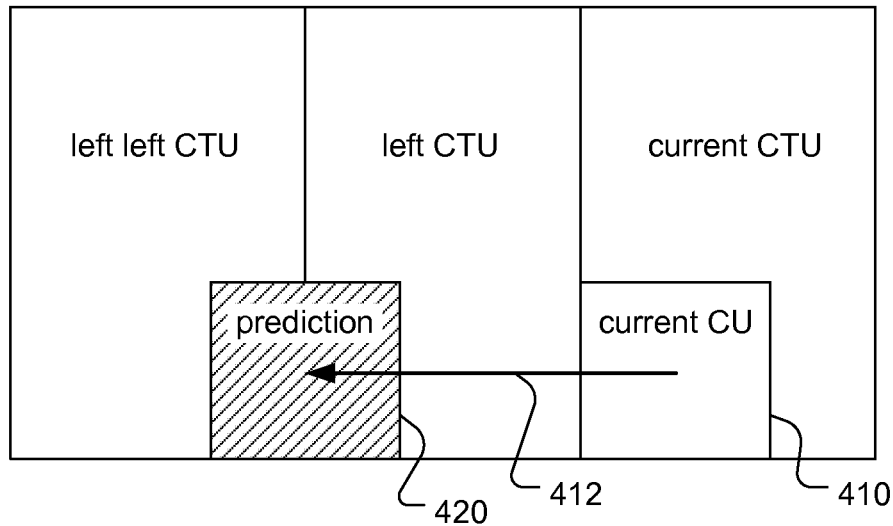
FIG. 4 illustrates an example of Intra motion compensation according to the Intra-block copy (IntraBC) mode, where a horizontal displacement vector is used.
Figure 5:
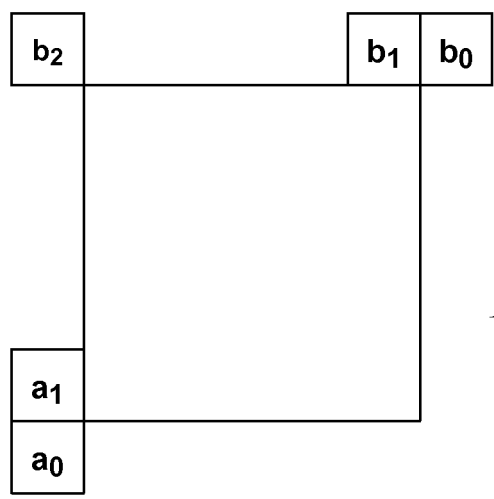
FIG. 5 illustrates an example of neighboring blocks for motion vector prediction according to the advanced motion vector prediction (AMVP) mode of HEVC.

The following description is of the best-contemplated mode of carrying out the invention. This description is made for the purpose of illustrating the general principles of the invention and should not be taken in a limiting sense. The scope of the invention is best determined by reference to the appended claims.

According to embodiments of the present invention, an IntraBC coded block is treated as a non-Intra mode during the deblocking filtering process while a reconstructed block refers to a compensation block from a picture different from the current picture is treated as an Inter coded block. The block vector (BV) of current IntraBC coded block will be used, along with other coding parameters, to decide whether the boundary filter strength (BS) is assigned a value equal to 1 or 0.

For the IntraBC signaling, there are two approaches being practiced: ref_idx approach and ibc_flag approach. According to the ref_idx approach, the current picture is treated as a reference picture for IntraBC coded block, and specific RefList and ref_idx values will be assigned to this IntraBC coded block. According to the ibc_flag approach, the IntraBC coded block is signaled by a flag, referred as ibc_flag or intra_bc_flag. Please note, a slice is a video structure used for video coding, where a picture is divided into multiple slices and each slice is allowed to use a set of coding parameters specific for the slice. Also, coding information specific to the current slice may be signaled in the slice header so that the slice specific coding information can be recovered at the decoder side. For each of the two IntraBC signaling approaches (i.e., ref_idx and ibc_flag), there are three cases to be considered for boundary filter strength decision for deblocking filter of the boundary edge involved with at least one IntraBC coded block.

IntraBC Signaling Based on the Ref_Idx Approach

Case 1.

One block next to the block boundary is Intra coded and the other block is IntraBC coded. The BS will be assigned a value equal to 2 for this boundary edge.

Case 2.

One block next to the block boundary is Inter coded and the other block is IntraBC coded. According to an embodiment of the present invention, the current picture containing the IntraBC coded block is treated as the reference picture for the IntraBC coded block. The reference picture (i.e., the current picture) is placed into a specific reference picture list, RefList. A specific reference picture index value, ref_idx will be assigned to this IntraBC coded block so that these parameters can be used during the deblocking process. For example, the current picture can be assigned to reference picture list 0 (L0) and the reference picture index, ref_idx is determined according to:

$$ref\_idx = num\_ref\_idx\_l0\_active\_minus1 + 1, \quad (1)$$

where num_ref_idx_l0_active_minus1 is a slice header syntax indicating the number of reference pictures in L0 for the current slice.

Regular Inter reference pictures will have their ref_idx ranging from 0 to num_ref_idx_l0_active_minus1, inclusively. In general, any ref_idx not used by regular Inter reference pictures, such as ref_idx=-1 (or a total number of reference picture indices in reference picture list L0) can be assigned to the IntraBC coded block. The step 2 and step 3 of the BS decision process as mentioned previously can be applied to determine the BS value.

In another example, the current picture is assigned to reference picture list 1 (i.e., L1) and reference picture index ref_idx is determined according to:

$$ref\_idx = num\_ref\_idx\_l1\_active\_minus1 + 1, \quad (2)$$

where num_ref_idx_l1_active_minus1 is a slice header syntax indicating the number of reference pictures in L1 for the current slice. Regular Inter reference pictures will have their ref_idx ranging from 0 to num_ref_idx_l1_active_minus1, inclusively. In general, any ref_idx not used by regular Inter reference pictures, such as ref_idx=-1 (or a total number of reference picture indices in reference picture list L1) can be assigned to the IntraBC coded block. The step 2 and step 3 of the BS decision process as mentioned previously can be applied to determine the BS value.

In yet another embodiment, the current picture is assigned a third reference picture list (e.g. L2) different from L0 and L1. An arbitrary ref_idx value (such as 0 or -1) can be assigned to this IntraBC coded block. The step 2 and step 3 of the BS decision process as mentioned previously can be applied to determine the BS value. In one embodiment, if step 3 of the BS decision process is applied, the BS for the related boundary edges will be assigned a value equal to 1 since the reference pictures for the Inter coded block and IntraBC coded block are different.

Case 3.

Both blocks at the block boundary are IntraBC coded. Similar to Case 2, both blocks will be assigned a specific RefList value and ref_idx value so that these parameters can be used during the Inter deblocking process. In this case, the RefList and ref_idx for both of blocks should be the same. The step 2 and step 3 of the BS decision process as mentioned previously can be applied to determine the BS value. In one embodiment, if step 3 of the BS decision process is applied, the BS for the related boundary edges will be assigned a value equal to one or zero based on at least one of the following factors: a reference picture list (RefList), a reference picture index (RefIdx), a number of BVs used, and BV difference associated with the two neighboring IntraBC coded block. For example, when the two neighboring IntraBC coded blocks refer to the same reference picture and the two BVs associated with the two neighboring IntraBC coded blocks are the same, the BS is set to 0. Otherwise BS is set to 1.

IntraBC Signaled Based on the Ibc_Flag Approach

Case 1.

One block at the block boundary is Intra coded and the other block is IntraBC coded. The BS will be assigned a value equal to 2 for this boundary edge.

Case 2.

One block at the block boundary is Inter coded and the other block is IntraBC coded. The BS will be assigned a value equal to 1 for this boundary edge.

Case 3.

Both blocks at the block boundary are IntraBC coded. Two BVs of these two blocks are referred as BV0 and BV1. If the absolute difference between the horizontal or vertical component of BV0 and BV1 is greater than or equal to N, the BS will be assigned a value equal to 1 for this boundary edge. Otherwise, the BS will be assigned a value equal to 0 for this boundary edge. N can be 1, 2, 4 or other integer numbers.

IntraBC BV Shift

In HEVC, the MV for the luma component has quarter sample accuracy for Inter coded blocks. On the other hand, the BV for the IntraBC coded block has integer accuracy. According to one embodiment of the present invention, the BV for an IntraBC coded block is converted to have the same accuracy as the MV for the luma component. For example, BV can be left shifted by two during the deblocking filter process. Therefore, the left-shifted BV will have the same precision as the MV of an Inter coded block.

The performance of a system incorporating an embodiment of the present invention is compared to an anchor system based of SCM-3.0 software (Screen Content Coding Test Model version 3.0). The system incorporating an embodiment of the present invention uses IntraBC signaling based on the ref_idx approach and the BS decision process is described in case 1 through case 3 associated with IntraBC signaling based on the ref_idx approach. On the other hand, the system based on SCM-3.0 treated any IntraBC coded block next to the block boundary as an Intra block. The test is conducted for various test video materials. The performance is compared based on BD-Rate, where the BD-Rate is a well-known performance measure in the field of video coding. Performance comparison is performed for various configurations including all Intra, random Access and Low-Delay B-picture. Based on the comparison, the system incorporating an embodiment of the present achieves RD- Rate reduction up to 1.3% for the all Intra configuration, up to 1.9% for the Random Access configuration and up to 2.9% for the Low-Delay B-pictures configuration.

Figure 6:
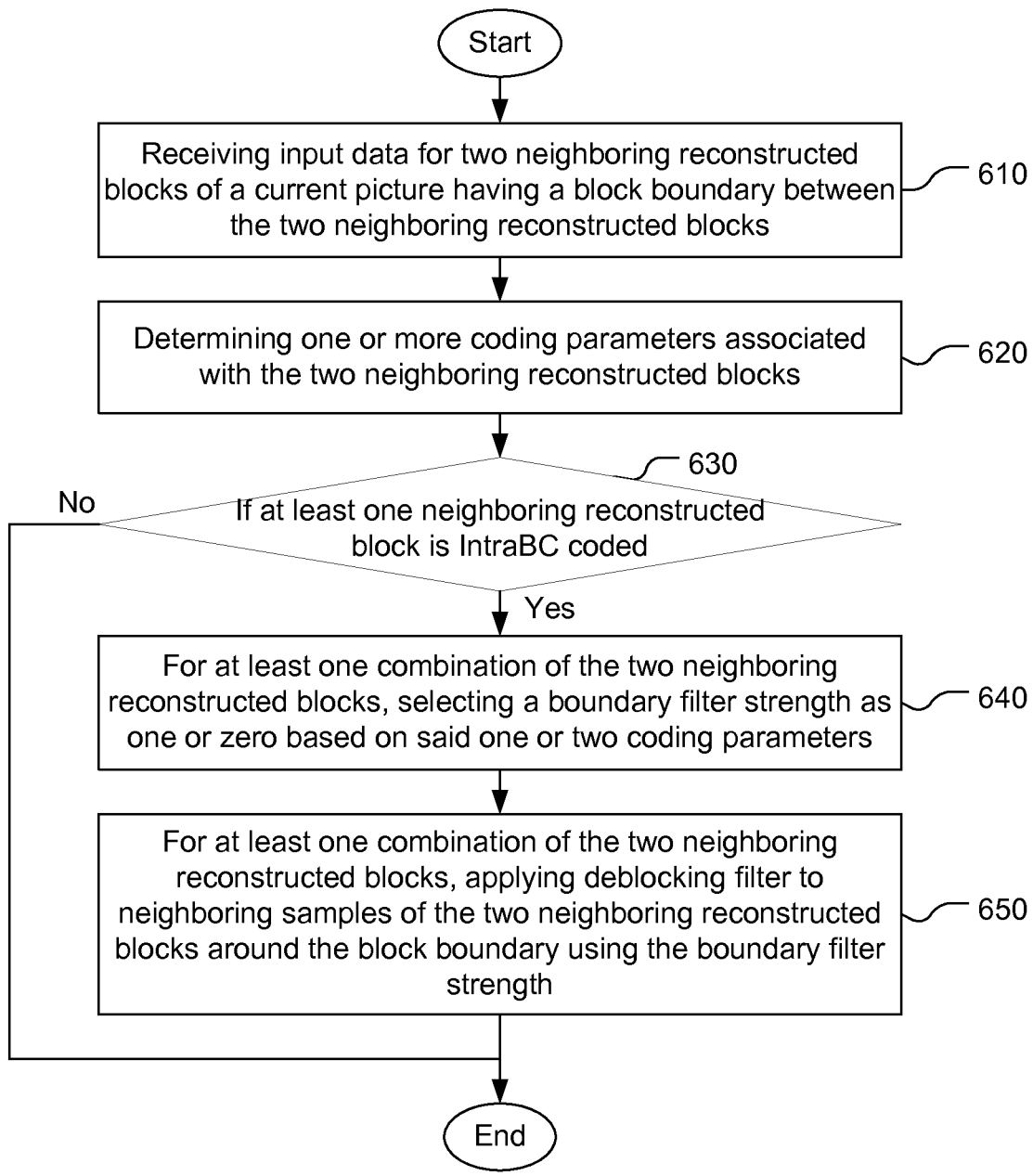
FIG. 6 illustrates an exemplary flowchart for a coding system including an Intra Block Copy (IntraBC) mode, wherein the system uses boundary filter strength derivation incorporating an embodiment of the present invention.

FIG. 6 illustrates an exemplary flowchart for a coding system including an Intra Block Copy (IntraBC) mode, wherein the system uses boundary filter strength derivation incorporating an embodiment of the present invention. The system receives input data for two neighboring reconstructed blocks of a current picture having a block boundary between the two neighboring reconstructed blocks as shown in step 610. The input data includes reconstructed data for the two neighboring blocks to be filtered by deblocking filter. The input data may also include coding parameters associated with the two neighboring blocks at both sides of the block boundary. For encoding, the coding parameters may also be derived at the encoder side. For decoding, the coding parameters may be parsed from the bitstream received by the decoder. The input data may be retrieved from memory (e.g. computer memory, buffer (RAM or DRAM) or other media) or from a processor. One or more coding parameters associated with the two neighboring reconstructed blocks are determined in step 620. In step 630, "if at least one neighboring reconstructed block is IntraBC coded" is tested. If the result is "Yes", the step 640 and step 650 are performed. If the result is "No", the step 640 and step 650 are skipped and in this case, the BS decision process according to the conventional HEVC (e.g., SCM-3.0) may be used.

The flowchart shown above is intended to illustrate an example of IntraBC coding according to the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of applying a deblocking filter to block boundaries in a video coding system including an IntraBC (Intra-block copy) mode, the method comprising:
   receiving input data associated with two neighboring reconstructed blocks of a current picture having a block boundary between the two neighboring reconstructed blocks;
   determining one or more coding parameters associated with the two neighboring reconstructed blocks;
   setting a boundary filter strength for the block boundary according to the one or more coding parameters, including:
      in a case that the two neighboring reconstructed blocks include an IntraBC coded block and an Inter coded block,
         determining whether a condition is met, the condition including a combination of the block boundary corresponding to a transform block edge, and at least one of the two neighboring reconstructed blocks having a non-zero transform coefficient,
         when the condition is determined to be met, setting a boundary filter strength to one, and
         when the condition is determined not to be met, setting the boundary filter strength to one or zero according to reference pictures of the two neighboring reconstructed blocks; and
   applying the deblocking filter to neighboring samples of the two neighboring reconstructed blocks around the block boundary according to the set boundary filter strength.

2. The method of claim 1, wherein the setting the boundary filter strength when the condition is determined not to be met is performed according to one or more factors selected from a coding-parameter group comprising a reference picture list (RefList), a reference picture index (RefIdx), a number of motion vectors used, and motion vector difference associated with the two neighboring reconstructed blocks.

3. The method of claim 1, wherein the setting the boundary filter strength when the condition is determined not to be met comprises setting the boundary filter strength to one responsive to the reference pictures of the two neighboring reconstructed blocks being determined as different.

4. The method of claim 1, wherein when each IntraBC coded block is signaled using a reference picture index value and the two neighboring reconstructed blocks correspond to two IntraBC coded blocks, if the block boundary is also one transform block edge and at least one of the two neighboring reconstructed blocks has a non-zero transform coefficient, the boundary filter strength is set to one.

5. The method of claim 4, wherein if the block boundary is not one transform block edge or none of the two neighboring reconstructed blocks has non-zero transform coefficient, the boundary filter strength is set to one or zero according to one or more factors selected from a coding-parameter group comprising a reference picture list (RefList), a reference picture index (RefIdx), a number of block vectors used, and block vector difference associated with the two neighboring reconstructed blocks.

6. The method of claim 1, wherein when each IntraBC coded block is signaled using a reference picture index value and the two neighboring reconstructed blocks correspond to one IntraBC coded block and one Inter coded block, a specific reference picture index is assigned to said one IntraBC coded block.

7. The method of claim 6, wherein the current picture is used as a reference picture for said one IntraBC coded block.

8. The method of claim 7, wherein the current picture is assigned to a reference picture list corresponding to L0, L1, or a separate reference picture list different from L0 and L1.

9. The method of claim 6, wherein the specific reference picture index corresponds to a value not used by regular Inter reference pictures in a current slice header.

10. The method of claim 9, wherein the specific reference picture index corresponds to −1 or a total number of reference picture indices in reference picture list L0 or L1.

11. The method of claim 1, wherein when each IntraBC coded block is signaled using a reference picture index value and the two neighboring reconstructed blocks correspond to two IntraBC coded blocks, a same specific reference picture list and a same specific reference picture index are assigned to said two IntraBC coded blocks.

12. The method of claim 1, wherein each IntraBC coded block is signaled using an IntraBC flag.

13. The method of claim 1, wherein, when each IntraBC coded block is signaled using a IntraBC flag and the two neighboring reconstructed blocks correspond to two IntraBC coded blocks,
the boundary filter strength is set to one when a difference between two block vectors associated with the two IntraBC coded blocks is greater than or equal to a threshold, and
the boundary filter strength is set to zero when the difference is less than the threshold.

14. The method of claim 13, wherein the threshold corresponds to one, two or four.

15. The method of claim 1, wherein if any of the two neighboring reconstructed blocks refers to a compensation block from another picture, said any of the two neighboring reconstructed blocks is considered as an Inter coded block with regard to said selecting the boundary filter strength.

16. The method of claim 1, wherein for each IntraBC coded block at one side of the block boundary, a block vector of each IntraBC coded block is converted to quarter-sample accuracy with regard to said selecting the boundary filter strength as one or zero based on said one or more coding parameters.

17. The method of claim 16, wherein the block vector of each IntraBC coded block is converted to the quarter-sample accuracy by left-shifting the block vector by two.

18. An apparatus for applying a deblocking filter to block boundaries in a video coding system including an IntraBC (Intra-block copy) mode, the apparatus comprising one or more electronic circuits configured to:
receive input data associated with two neighboring reconstructed blocks of a current picture having a block boundary between the two neighboring reconstructed blocks;
determine one or more coding parameters for the two neighboring reconstructed blocks;
set a boundary filter strength for the block boundary according to the one or more coding parameters, wherein the one or more electronic circuits are further configured to:
in a case that the two neighboring reconstructed blocks include an IntraBC coded block and an Inter coded block,
determine whether a condition is met, the condition including a combination of the block boundary corresponding to a transform block edge, and at least one of the two neighboring reconstructed blocks having a non-zero transform coefficient,
when the condition is determined to be met, set a boundary filter strength to one, and
when the condition is determined not to be met, set the boundary filter strength to one or zero according to reference pictures of the two neighboring reconstructed blocks; and
apply the deblocking filter to neighboring samples of the two neighboring reconstructed blocks around the block boundary according to the set boundary filter strength.

19. The apparatus of claim 18, wherein the one or more electronic circuits are configured to set the boundary filter strength when the condition is determined not to be met according to one or more factors selected from a coding-parameter group comprising a reference picture list (RefList), a reference picture index (RefIdx), a number of motion vectors used, and motion vector difference associated with the two neighboring reconstructed blocks.

20. The apparatus of claim 18, wherein the one or more electronic circuits are configured to, when the condition is determined not to be met, set the boundary filter strength to one responsive to the reference pictures of the two neighboring reconstructed blocks being determined as different.

* * * * *